(12) United States Patent
Bingham et al.

(10) Patent No.: US 7,536,280 B2
(45) Date of Patent: **\*May 19, 2009**

(54) MULTISIDED SYNCHRONIZATION OF EXECUTION IN A WIRELESS TEST ENVIRONMENT

(75) Inventors: David E Bingham, Fort Collins, CO (US); Carolyn Darbie, Fort Collins, CO (US); Stephen Craig Booth, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 708 days.

This patent is subject to a terminal disclaimer.

(21) Appl. No.: 11/195,978

(22) Filed: Aug. 3, 2005

(65) Prior Publication Data

US 2007/0032253 A1   Feb. 8, 2007

(51) Int. Cl.
   *G06F 19/00*   (2006.01)
   *G06F 15/00*   (2006.01)

(52) U.S. Cl. .................. 702/189; 702/108; 702/122; 714/38

(58) Field of Classification Search ................ 702/108, 702/122, 189; 713/155, 201, 202; 714/38, 714/43; 709/217, 224
See application file for complete search history.

(56) References Cited

U.S. PATENT DOCUMENTS 6,950,848 B1 * 9/2005 Yousefi'zadeh ............. 709/203
6,986,038 B1 * 1/2006 Leah et al. ................. 713/155

FOREIGN PATENT DOCUMENTS

FR   EP1650924 A1   4/2006
GB   2379040 A      2/2003

* cited by examiner

*Primary Examiner*—Bryan Bui

(57) ABSTRACT

Methods, devices and systems for synchronizing the execution of tests between or among multi-sided test components in a wireless environment are described. Multiple flows are initiated substantially simultaneously. Execution is then paused in at least one of the flows. The paused flow sends a request for permission to resume execution to a sync servlet. The sync servlet does not respond affirmatively to the request until an appropriate synchronization signal is received from an unpaused flow, and then only after a desired test component in the unpaused flow has been executed. The paused flow is resumed upon receiving the appropriate synchronization signal from the sync servlet.

29 Claims, 3 Drawing Sheets

MULTISIDED SYNCHRONIZATION OF EXECUTION IN A WIRELESS TEST ENVIRONMENT

RELATED PATENT APPLICATION

U.S. patent application Ser. No. 11/195,979 filed on Aug. 3, 2005 by Bingham et al. entitled "Multi-Sided Sharing of Dynamic Data in a Wireless Test Environment" and assigned to Agilent Technologies, Inc. is hereby incorporated by reference herein in its entirety.

FIELD OF THE INVENTION

The present invention relates to an apparatus and method for synchronizing flows between and among multi-sided tests, and more particularly to an apparatus and method for testing one or more networks and synchronizing the execution of multiple flows in multi-sided tests.

BACKGROUND

The term 'test software' is used to describe a software product whose primary function is to examine how a system is functioning. The test software collects its input from agents, which are individual members of a system being tested.

Some examples where test software is employed include mobile or wireless phone networks and other types of telecommunication networks or systems, river water quality monitors and automobile performance test systems. Networks or systems are often geographically and/or temporally distributed. The test software for such systems must collect data from different locations or at different times to test such a system.

Despite the many advances that have been made in the field of wireless network testing, certain problems persist. These problems include an inability to synchronize the execution of test flows between or among flows or sides in an open manner that employs common standards, an inability to synchronize execution between flows (or virtual threads of execution) except when using a proprietary interface, and an inability to test wireless services that depend on orders of execution between flows unless a proprietary interface is included in the system architecture.

Agilent's Wireless QOS Manager (WQM) is capable of running multi-step, multi-sided tests. However, the SIGOS Site application with which WQM currently integrates is a proprietary interface. In consequence, data being shuttled between one flow and another (or from one side to another) must first flow through the proprietary SIGOS Site infrastructure. A system being tested that does not contain a SIGOS Site infrastructure will not permit synchronization between or among flows or sides.

What is desired is a Wireless QOS Manager having the ability to synchronize test execution between or among sides and/or flows, whether or not a SIGOS or other proprietary site infrastructure is being used.

The following publication and patent application, each hereby incorporated by reference herein in its respective entirety, disclose various prior art teachings concerning WQMs:

Agilent Technologies, Inc. Information Sheet entitled "Agilent OSS QoS Manager" viewable at http://we.home.agilent.com/cgi-bin/bvpub/agilent/Product/cp_Product.jsp?OID=536882909&NAV_ID=5368853-80.536882909.00&LANGUAGE_CODE=eng&COUNTRY_CODE=ZZ&CT=PRODUCT&JPID=/comms/firehunter U.S. patent application Ser. No. 10/736,835 entitled "Sequential Coordination of Test Execution and Dynamic Data" to Bingham As those skilled in the art will appreciate after having read and understood the present Summary, Figures, Detailed Description and Claims, at least some of the devices, systems and methods disclosed in the foregoing publication and patent application may be modified advantageously in accordance with the teachings of the present invention.

SUMMARY OF THE INVENTION

Methods, devices and systems for synchronizing the execution of multi-sided tests between or among multi-sided test components in a communication or test environment, such as a wireless telecommunication environment, are disclosed. Multiple flows in a system such as a wireless test configuration are initiated substantially simultaneously. Execution is then paused in at least one of the flows. From the flow not paused, a synchronization signal is sent to a sync servlet. The paused flow requests permission from the sync servlet to resume flow. The paused flow is resumed upon receiving a synchronization signal from the sync servlet.

The present invention includes within its scope the methods of synchronizing described above, hereinbelow and in the Figures, as well as systems and test agents capable of carrying out such methods.

Various embodiments of the present invention may be characterized by one or more of the following aspects:

(a) Synchronization between or among multiple flows in a wireless service test is permitted, even if a proprietary interface is not employed in the system being tested;

(b) A sync servlet permits a flow to pause execution (await sync), while waiting for a go ahead message from another flow (send sync), thereby permitting wireless services to be tested that require such functionality;

(c) A sync servlet permits control of execution between or among flows (or virtual threads of execution);

(d) An open common standard for data transfer such as HTTP, HTTPS, FTP, may be employed to effect the synchronization of test execution between or among multiple flows and/or between multiple third-party applications;

(e) Data may be securely transferred using an HTTPS protocol;

(f) Timeouts may be configured as required;

(g) The location of a sync servlet may be changed, which is useful for configurations having firewalls;

(h) Sync servlets may be run on any Wireless QOS agent or on any web server that supports servlets;

(i) If a synchronization event has lived beyond a configurable time, it is automatically deleted.

The foregoing and other aspects and advantages of various embodiments of the present invention will become apparent and more readily appreciated after the detailed description of the preferred embodiments, the drawings and claims have been read and understood

DETAILED DESCRIPTION OF THE PREFERRED EMBODIMENTS

Figure 1:
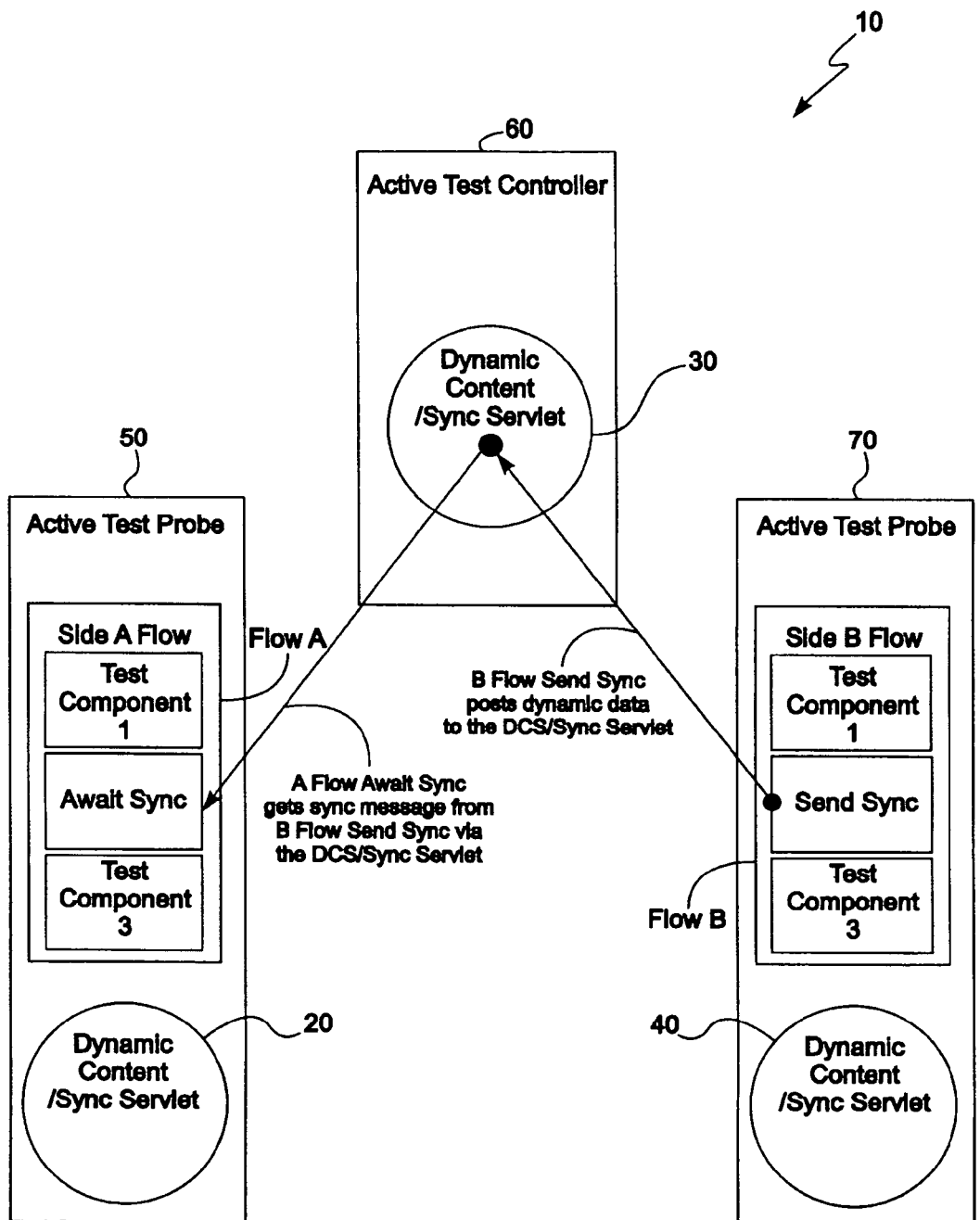
FIG. 1 illustrates one embodiment of the present invention.

FIG. 1 shows one embodiment of the present invention, where flows A and B in a multi-sided test system are synchronized using sync servlets 20, 30 and 40 located, respectively, in Active Test Probe 50 corresponding to Flow A, Active Test Controller 60, and Active Test Probe 70 corresponding to Flow B.

In a preferred embodiment of the present invention, each of Active Test Probe 50, Active Test Controller 60 and Active Test Probe 70 is an individual agent in system 10, although other configurations are possible and fall within the scope of the present invention. Note that sync servlets 20 and 40 in FIG. 1 are not employed in the example given below, but may be employed in other configurations or flows not disclosed explicitly herein. Depending on the system configuration at hand, the appropriate destination for a particular signal or message, such as an "Await Synch" or "Send Synch" signal, may or may not need to be specified, although in a preferred embodiment of the present invention such a destination must be specified as indicated in the schemata set forth below. For example, the "Send Sync" signal originating in Flow B of FIG. 1 may be specified as having an ultimate destination in Flow B, and the "Await Synch" signal originating in Flow A may be specified as having an ultimate destination in sync servlet 30.

In FIG. 1, Flow A is represented by Test Component 1, Test Component 2 ("Await Sync") and Test Component. 3 in Active Test Probe 50. Flow B is represented by Test Component 1, Test Component 2 ("Send Sync") and Test Component 3 in Active Test Probe 70. First and second flows A and B are initiated substantially simultaneously. Execution of Flow A pauses upon Flow A having proceeded to the second "Await Sync" test component or event. Execution of the "Await Sync" test component in Flow A causes a message or instruction to be sent or posted to sync servlet 30 stating that Flow A awaits the receipt of a "Send Sync" signal or message from Flow B. The amount of time the "Await Sync" test component in Flow A will await receipt of a "Send Sync" signal may be a configurable timeout. When Flow B has proceeded to the "Send Sync" test component, a "Send Sync" signal is posted to sync servlet 30. The next time Flow A requests permission to resume execution (i.e., "Has a "Send Sync" signal been received from Flow B?"), the "Send Sync" signal has already been received by sync servlet 30, and Flow A receives permission to resume execution by running the next step (i.e., execution of Test Component 3 now occurs).

By way of illustrative example only and with no intention of limiting the scope of the present invention, FlowA:test1 in FIG. 1 may be a test that navigates to a webpage requesting authentication information for logging into a 802.11 wifi network, and having the bill and login information sent to a cell phone account. FlowB:test1 then receives the confirmation message on the cell phone with the username and password. FlowA:test3 next uses the username and password to login to the wifi network. FlowA:test3 cannot login before FlowB:test1 has received proper authentication information. The FlowA:await sync causes execution to pause until FlowB:send sync has been sent, at which point execution continues. As will now be appreciated, send sync and await sync functionalities may be implemented in multiple flows to allow more complicated multi-sided and multi-flow networks or systems to be tested.

Note that the embodiment of the present invention shown in FIG. 1 is specifically adapted for use in a wireless service test setting such as a wifi login application, although numerous other applications are contemplated and nevertheless fall within the scope of the present invention.

Continuing to refer to FIG. 1, each of sync servlets 20, 30 and 40 may be a multi-threaded program running on any of agents 50, 60 and 70 in system 10. Each agent should possess sync servlet functionality, even though such functionality may not be used in respect of a given servlet according to a particular system configuration. For example, sync servlet functionality may be imparted to agents 60 and 70 and not 50, while still permitting the testing procedures described above to occur. In an optimal system configuration, however, each agent possesses dynamic content servlet functionality.

Tests may be invoked by a caller located remotely from any of the agents of system 10 if the caller is connected to a network to which such agents are connected, or to which one of such agents is connected. Such a network may be any network, such as the internet. In one embodiment of the present invention, agents 50, 60 and 70 may be computers and/or server.

According to one embodiment of the present invention, dynamic content servlet functionality is added to a sync=servlet. While dynamic content servlet functionality differs from that of a sync servlet, dynamic content servlet functionality may generally be piggybacked onto a sync servlet to avoid running multiple servlets, as shown in FIG. 1.

In one embodiment of the present invention, test descriptions or requests to synchronize may be incorporated into a predefined XML schema (or even plain text) in either an HTTP post or an HTTPS post. HTTP (Hyper Text Transfer Protocol) is a generic message transport standard, or a standardized way of communicating over the internet. An HTTP Get is what a web browser does; it only receives data. But an HTTP Post allows sending of a body of data and also receipt of an answer.

The body of data sent by an HTTP Post is organized via the XML schema. XML (Extensible Markup Language) is a standardized way of encoding data, or in other words, genericizing the data, enabling definition, transmission, validation, and interpretation of the data between applications.

Interface design details implementing one embodiment of the invention illustrated in FIG. 1 are set forth below in Example 1, where text representations of sync servlet input schema are shown. While the sync servlet implementation set forth hereinbelow is written in Java, such functionality may be implemented in any suitable programming language, or run under any web server that supports servlets. Other standards-based servers and protocols may also be used to implement sync servlets. Sync servlets may accept HTTP posts with a defined XML encoded body only to enter or get data. Using such a functionality, a sync object contained by each test running in a given flow may then post data to or get data from the sync servlet. The sync servlet may be posted to using HTTP or HTTPS (secure socket layer) to ensure security.

EXAMPLE 1

Wqm Sync Servlet Interface Design (A) Input and Output Interface to the Sync/Dynamic Content Servlet (1) Brief Description The Dynamic Data Servlet will run on any QOSM WQM agent. It provides a data store for dynamic data of running tests and processes requests to "add", "remove" or "get" dynamic data for a specific uniqueid, or to "delete" all data for that uniqueid.

(2) Dynamic Data Design related assumptions
 The following attributes are found in the Wireless section of fh.conf. They may be overwritten by hidden (fh prefix) attributes in the Wireless Chain Test itself.
  DcsLocation?—-(String) default is the same as the Host (ATC) attribute.
  DcsPort?—-(Integer) default is 16716
  DcsTimeout?—-(Integer) default 0 (look once, no waiting)
  DcsLookup?—-(Boolean) default true (check DCS if not in local store)
 The following must be available in the flow level data stores:
  DcsLocation
  DcsPort
  DcsTimeout
  DcsLookup
  ChainId-(String) a unique id for this test execution
  FlowId-(String) the name of the current flow,
 A DcsControl test component will be available to change the values of the Dcs* attributes described above
 The DcsPurgeTime entry in the Wireless section of fh.conf will define the age at which to purge old data in DCS (in hours)

(3) Technical Requirements
 Ability to run a servlet on the QOSM agent.
 Defined XML interface for the HTTP Request and Response.

(4) Definition or Design Description
 The interface to the servlet will be an HTTP Post.
 Example url!🖳http://<DcsLocation>:<DcsPort?—>/DynamicContentServlet?—
 The body of the post will be XML. The XML interface is defined herein.
 The behavior of the DCS mimics a Hashtable:
  It is not legal to store a null key or value, a NullPointerException will result.
  A "put" returns the value previously stored (or null if no value was found)
  A "get" returns the value stored (or null if no value was found)
  A "remove" returns the value previously stored (or null if no value was found)
  A "delete" removes all data for a unique id, and returns all values previously stored.
 The DCS has some special behavior when storing "Sync" datum is stored.
  The name of the Sync datum is "dcs_sync<fromFlow>:<toFlow>"
  The value stored for a Sync type datum is an integer.
  If a value already exists for this datum, it is incremented by another "put"
  The value for this datum is decremented by a "get", if the resulting value is 0, the datum is removed.
 Purging of old data not properly removed at the end of test execution is carried out.
  The DcsPurgeTime value found in fh.conf is used as the age to delete old test data, with a default of 24 hours.
  The frequency of checking for old data to purge is based on the aging value (1/10th the value).

(5) SITE Dependencies
 TDL code that can call the DynamicContentServlet?—, wait for the response and accept the output.

(6) Generating and parsing the XML in Tcl and Java
 Description:
  Learning curve on parsing XML
 Resolution/Progress:
  Learning the Document Object Model in jdk1.4.1 to parse XML
  Utilizing procedures already present in Tdl for handling XML (7) Building the outgoing XML in java
 Description:
  Learning curve on parsing XML
 Resolution/Progress:
  Learning the Document Object Model in jdk1.4.1 to parse XML Assumptions
 The XML sent must be in the correct form or will not be validated.

Technical Requirements
 The interface is an HTTP Post that contains an XML body as the input to the servlet.
 The output is the Post response, also in XML format.

(B) Definition or Design Description

```
Input "put" Request Syntax
    <DcsRequest>
        <UniqueId> chainId </UniqueId>
        <Action> put </Action>
        <DynamicData> (can contain multiple Datum tags)
            <Datum>
                <Name> datumName </Name>
                <Type> datumType </Type>
                <Value> datumValue </Value>
            </Datum>
        </DynamicData>       >
    </DcsRequest>
Input "put" Sync Request Syntax
    <DcsRequest>
        <UniqueId> chainId </UniqueId>
        <Action> put </Action>
        <DynamicData>
            <Datum>
                <Name> dcs_sync:<fromFlow>:<toFlow> </Name>
                <Type> Integer </Type>
                <Value> 1 </Value>
            </Datum>
        </DynamicData>       >
    </DcsRequest>
Input "get" Request Syntax
    <DcsRequest>
        <UniqueId> chainId </UniqueId>
        <Action> get </Action>
        <Timeout> 60 </Timeout>
        <DynamicData> (can contain multiple Datum tags)
            <Datum>
                <Name> datumName </Name>
            </Datum>
        </DynamicData>       >
    </DcsRequest>
Input "get" Sync Request Syntax
    <DcsRequest>
        <UniqueId> chainId </UniqueId>
        <Action> get </Action>
        <DynamicData>
            <Datum>
                <Name> dcs_sync:<fromFlow>:<toFlow> </Name>
            </Datum>
        </DynamicData>       >
```

-continued

```
    </DcsRequest>
Input "remove" Request Syntax
    <DcsRequest>
        <UniqueId> chainId </UniqueId>
        <Action> remove </Action>
        <Timeout> 60 </Timeout>
        <DynamicData> (can contain multiple Datum tags)
            <Datum>
                <Name> datumName </Name>
            </Datum>
        </DynamicData>    >
    </DcsRequest>
Input "delete" Request Syntax - deletes all data for a particular chain id
    <DcsRequest>
        <UniqueId> chainId </UniqueId>
        <Action> delete </Action>
    </DcsRequest>
Output Response Syntax if no Exception
    <DcsResponse>
        <UniqueId> chainId </UniqueId>
        <Action> (action from request) </Action>
        <DynamicData> (can contain multiple Datum tags)
            <Datum>
                <Name> datumName </Name>
                <Type> datumType </Type>
                <Value> datumValue </Value>
            </Datum>
        </DynamicData>    >
    </DcsResponse>
Output Response Syntax if Exception
    <DcsResponse>
        <UniqueId> chainId </UniqueId>
        <Action> (action from request) </Action>
        <Exception>
            <Type> exception type </Type>
            <Message> exception message </Message>
            <StackTrace> exception stack trace </StackTrace>
        </Exception>
    </DcsResponse>
SQM (Firehunter) Dependencies
    None
SITE Dependencies
    Ability to do an HTTP Post to the servlet with the correct XML body.
    Ability to receive the post response XML.
```

The sync servlet schemata set forth above and illustrated in the Figures are only examples. The present invention is not limited to such schemata; other schemata may be used and still fall within the scope of the present invention; provided, however, that appropriate changes are made to the sync servlets and their corresponding test components. Moreover, schemata of the present invention are not limited to XML; other markup ("tag") languages, or even plain text, and their corresponding test components, may also be employed.

Figure 2:
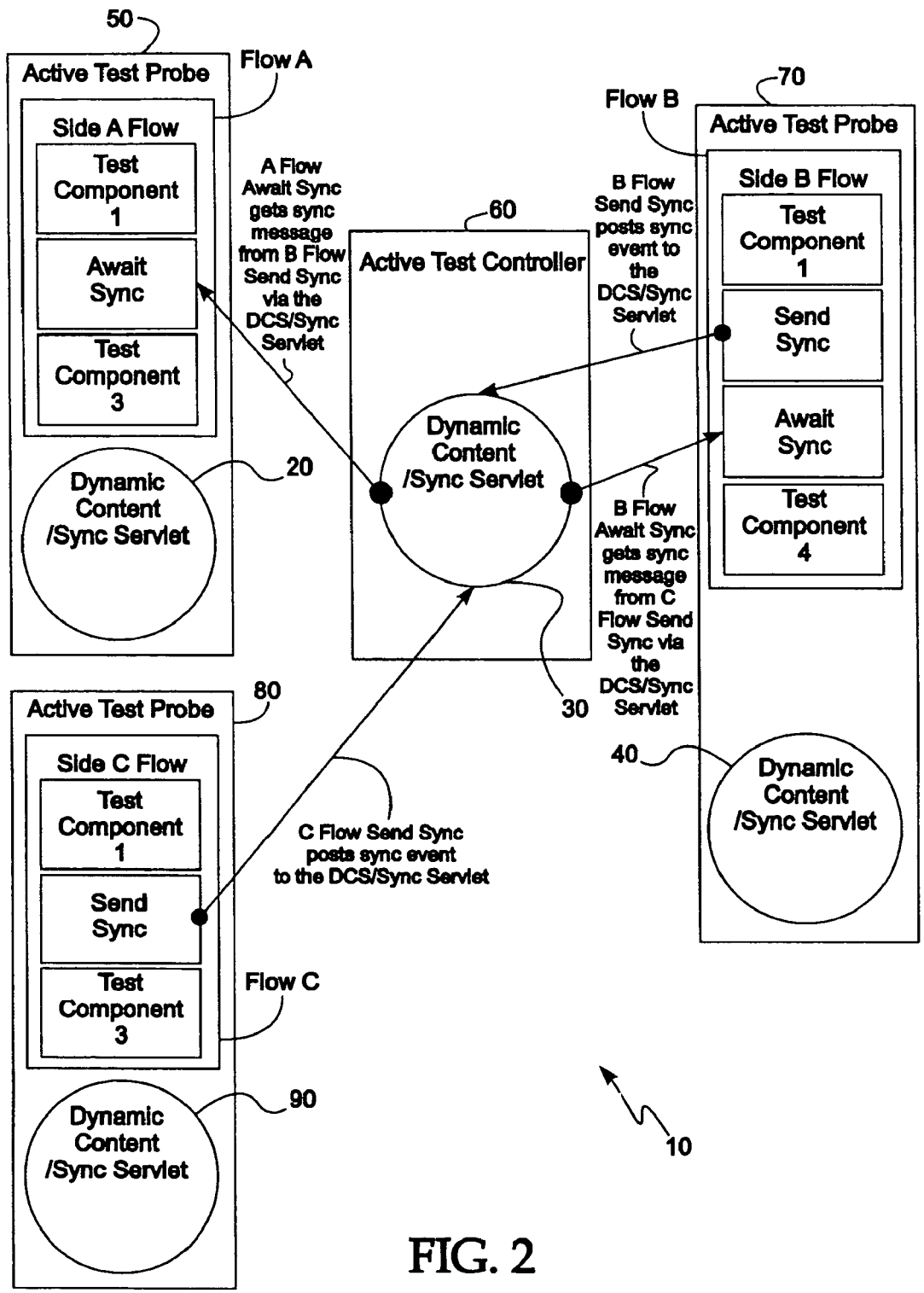
FIG. 2 illustrates another embodiment of the present invention.

FIG. 2 shows another embodiment of the present invention, where three Flows A, B and C are initiated concurrently. Each flow runs its first test component. When Flow A runs the "Await Sync" test component, Flow A is caused to pause execution until a "Send Sync" signal or message is received via sync servlet 30 from Flow B. The amount of time the "Await Sync" test component in Flow A will await receipt of a "Send Sync" signal may be a configurable timeout. When Flow B has proceeded to the "Send Sync" test component, a "Send Sync" signal is posted to sync servlet 30. The next time Flow A requests permission to resume execution (i.e., "Has a 'Send Sync' signal been received from Flow B?"), the "Send Sync" signal has already been received by sync servlet 30, and Flow A receives permission to resume execution by running the next step (i.e., execution of Test Component 3 now occurs). When Flow C reaches its "Send Sync" test component, a "Send Sync" signal or message is sent to Flow B via sync servlet 30. Once the "Send Sync" signal or message originating from Flow C is received by the "Await Sync" test component in Flow B, Flow B resumes execution to test component 4.

Figure 3:
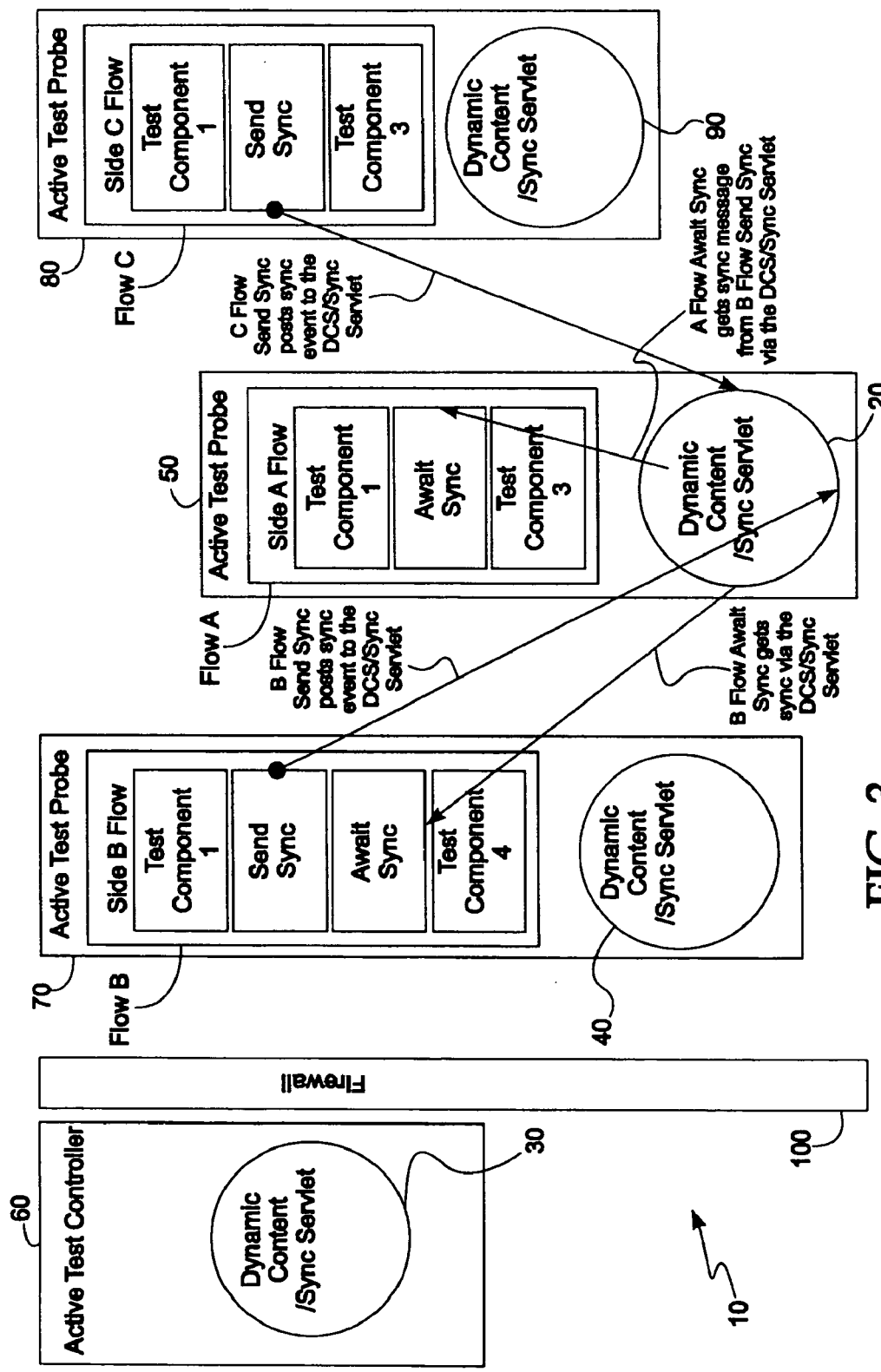
FIG. 3 illustrates yet another embodiment of the present invention.

FIG. 3 shows another embodiment of the present invention, where firewall 100 is disposed between Active Test controller 60 and Flows A, B and C. Flows A, B and C are initiated concurrently. Each flow runs its first test component. Because firewall 100 is disposed between Active Test Controller 60 and Active Test Probes 50, 70 and 80, however, sync servlet 30 may not be used. Nevertheless, in the embodiment of the present invention shown in FIG. 3, any sync servlet may be accessed by any of Active Test Probes 50, 70 or 80, thereby rendering system 10 operative. In FIG. 3, sync servlet 20 of Active Test Probe 50 is employed to fulfill such a function.

When Flow A has proceeded to the "Await Sync" test component, execution of Flow A is paused while awaiting receipt of a "Send Sync" signal or message from Flow B. When Flow B reaches second test component "Send Sync" sometime later, a "Send Sync" signal or message is posted to sync servlet 20 from Flow B. The "Await Sync" test component in Flow A receives the "Send Sync" signal from Flow B via sync servlet 20, which triggers the resumption of Flow A. Flow B continues execution to the "Await Sync" test, and is paused awaiting receipt of a "Send Sync" signal or message from Flow C. When Flow C reaches its "Send Sync" test component, a "Send Sync" signal or message is sent to Flow B via sync servlet 20. Once the "Send Sync" signal or message originating from Flow C is received by the "Await Sync" test component in Flow B, Flow B resumes execution to test component 4.

Various protocols are described herein, such as HTTP and HTTPS. The present invention in not limited to such protocols, however, and explicitly contemplates the use of other protocols such as FTP ("File Transfer Protocol"), SCP ("Secure Copy Protocol") and SFTP ("Secure File Transfer Protocol"). Similarly, various networks are described herein, such as a LAN, a wireless network, a wire line network, and the internet. The present invention is not limited to such networks; other networks may be employed and fall within the scope of the present invention.

The present invention may be employed successfully over a wide range of wireless network types and standards, including, but not limited to, wifi 802.11a, wifi 802.11b, wifi 802.11g, wimax, GSM/GPRS and CDMA, as well as other standards yet to be devised or implemented. Moreover, the present invention is not limited in scope to wireless test applications, and includes within its scope wireline test applications such as Ethernet/LAN and dial-up networks.

In a preferred embodiment, the synchronization methods of the present invention are carried out using an Agilent QoS ("Quality of Service") Manager Agent, many aspects of which are described at: http://we.home.agilent.com/cgi-bin/bvpub/agilent/Product/cp_Product.jsp?OID=536882909&NAV_ID=-536885380.536882909.00&LANGUAGE_CODE=eng&COUNTRY_CODE=ZZ&CT=PRODUCT&JPID=/comms/firehunter Note that certain aspects and applications of various embodiments of the present invention may be employed in the devices, systems and methods disclosed in U.S. patent application Ser. No. 10/736,835 entitled "Sequential Coordination of Test Execution and Dynamic Data" to Bingham, which is hereby incorporated by reference herein in its entirety.

Although a few embodiments of the present invention have been shown and described, it will be appreciated by those skilled in the art that changes may be made to such embodiments without departing from the scope and spirit of the invention, the scope of which is defined in the appended claims and their equivalents. For example, a system or agent carrying out one or more synchronization methods of the present invention by means of one or more proxies falls within the scope of the present invention.

We claim:

1. A method of synchronizing the flow of dynamically-generated data between or among multi-sided test components in a system having at least one sync servlet and at least a first flow and a second flow, comprising:
   substantially simultaneously initiating at least the first flow and the second flow;
   pausing execution in at least one of the first flow and the second flow;
   sending, from the flow not paused, a synchronization signal to a sync servlet;
   requesting, from the paused flow to the sync servlet, permission to resume execution;
   upon receipt of the synchronization signal by the synch servlet, granting permission to the paused flow to resume execution;
   resuming execution of the paused flow.

2. The method of claim 1, wherein the system is a wireless system.

3. The method of claim 1, wherein the system is a wireline system.

4. The method of claim 1, further comprising subjecting the system to a plurality of functional tests.

5. The method of claim 1, wherein the system does not include a proprietary interface.

6. The method of claim 1, wherein the sync servlet receives an "Await Sync" signal from the paused flow.

7. The method of claim 1, wherein the synchronization signal received by the sync servlet is a "Send Sync" signal.

8. The method of claim 1, wherein an open common communication standard for data transfer is employed to effect synchronization of flows.

9. The method of claim 8, wherein the open common communication standard is selected from the group consisting of HTTP, HTTPS, FTP, SCP and SFTP.

10. The method of claim 1, wherein schemata selected from the group consisting of XML, a markup language and plain text are employed to effect synchronization of flows.

11. The method of claim 1, wherein a timeout is configured for the paused flow.

12. The method of claim 11, wherein a location of the sync servlet is specified.

13. The method of claim 12, wherein the location of the sync servlet is changed.

14. The method of claim 1, wherein the sync servlet is run on a wireless QOS agent.

15. The method of claim 1, wherein the sync servlet is run on a web server.

16. The method of claim 1, wherein the synchronization signal is deleted or erased after a predetermined amount of time has passed.

17. The method of claim 1, wherein the sync servlet is configured accept at least one of an HTTP post, an HTTPS post, an FTP post, an SCP post and an SFTP post.

18. The method of claim 1, wherein the sync servlet accepts an XML encoded post to enter or get data.

19. The method of claim 1, wherein the sync servlet further comprises dynamic data content functionality.

20. A system for synchronizing the flow of dynamically-generated data between or among multi-sided test components having at least one sync servlet and at least a first flow and a second flow, comprising:
   means for substantially simultaneously initiating at least the first flow and the second flow;
   means for pausing execution in at least one of the first flow and the second flow;
   means for sending, from the flow not paused, a synchronization signal to a sync servlet;
   means for requesting, from the paused flow to the sync servlet, permission to resume execution;
   means for, upon receipt of the synchronization signal by the synch servlet, granting permission to the paused flow to resume execution, and
   means for resuming execution of the paused flow.

21. The system of claim 20, wherein the system is configured to test wireless systems operating under at least one of the wifi 802.11a standard, the wifi 802.1 b standard, the wifi 802.11g standard, the wimax standard, the GSM/GPRS standard and the CDMA standard.

22. The system of claim 20, wherein the system is configured to test a wireline system selected from the group consisting of a LAN network and a dial-up network.

23. A test agent for remotely synchronizing the flow of dynamically-generated data between or among multi-sided test components having at least one sync servlet and at least a first flow and a second flow, comprising:
   means for causing at least the first flow and the second flow to be initiated substantially simultaneously;
   means for causing execution to be paused in at least one of the first flow and the second flow;
   means for causing a synchronization signal to be sent to a sync servlet;
   means for causing permission to resume execution to be requested from the paused flow to the sync servlet;
   means for causing, upon receipt of the synchronization signal by the synch servlet, permission to be granted to the paused flow for execution to resume;
   means for causing execution of the paused flow to be resumed.

24. The test agent of claim 23, wherein the test agent is configured to test wireless systems operating under at least one of the wifi 802.11a standard, the wifi 802.11b standard, the wifi 802.11g standard, the wimax standard, the GSM/GPRS standard, the CDMA standard.

25. The test agent of claim 23, wherein the test agent is configured to test a wireline system selected from the group consisting of a LAN network and a dial-up network.

26. A method of manufacturing a test agent for synchronizing the flow of dynamically-generated data between or among multi-sided test components having at least one sync servlet and at least a first flow and a second flow, the method comprising:
   providing a means for causing at least the first flow and the second flow to be initiated substantially simultaneously;
   providing a means for causing execution to be paused in at least one of the first flow and the second flow;
   providing a means for causing a synchronization signal to be sent to a sync servlet;
   providing a means for causing permission to resume execution to be requested from the paused flow to the sync servlet;
   providing a means for causing, upon receipt of the synchronization signal by the synch servlet, permission to be granted to the paused flow for execution to resume;
   providing a means for causing execution of the paused flow to be resumed; and
   operatively assembling and connecting the foregoing means to produce the test agent.

27. The method of claim 26, further comprising, configuring the test agent to remotely synchronize the flow of the dynamically-generated data between or among the multi-sided test components.

28. The method of claim 26, further comprising, configuring the test agent to test wireless systems operating under at least one of the wifi 802.11a standard, the wifi 802.11b standard, the wifi 802.11g standard, the wimax standard, the GSM/GPRS standard and the CDMA standard.

29. The method of claim 26, further comprising, configuring the test agent to test a wireline system selected from the group consisting of a LAN network and a dial-up network.

* * * * *